July 7, 1942.　　　R. A. KAPLAN　　　2,288,906
EXTRACTING TOOL
Filed Oct. 6, 1938
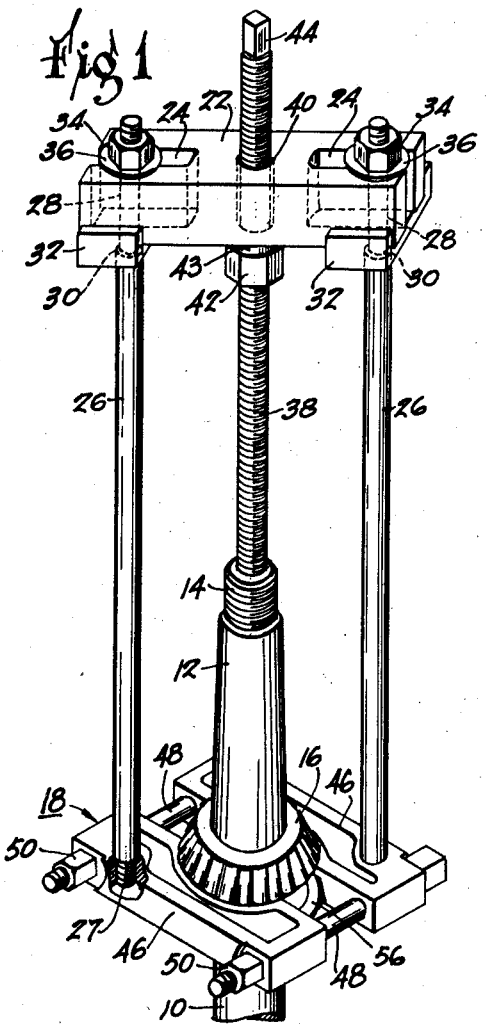
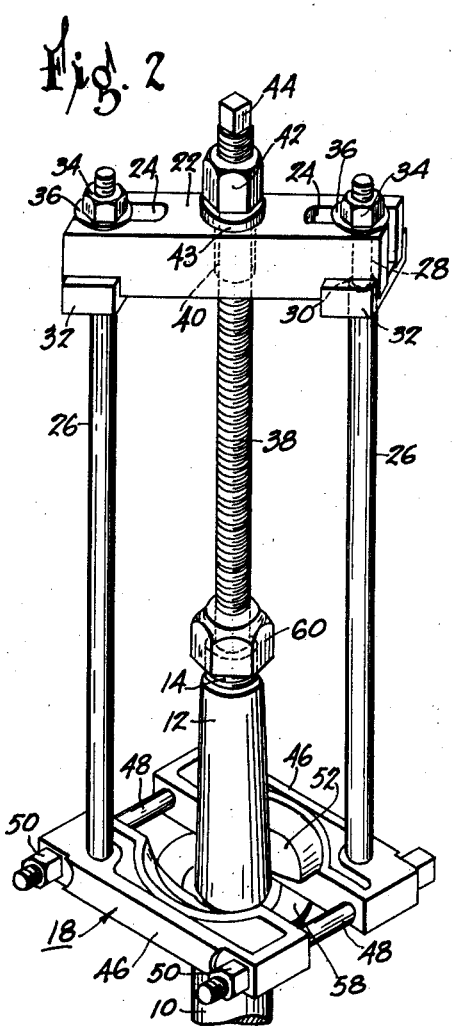
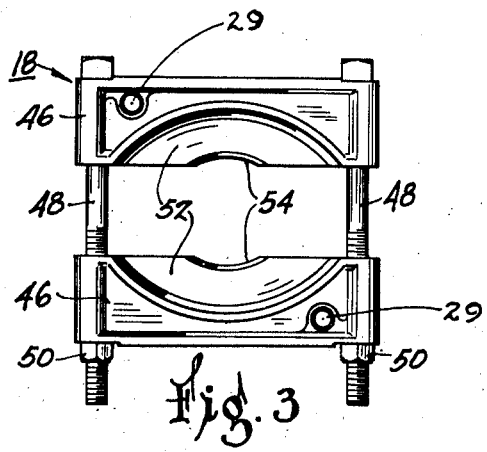
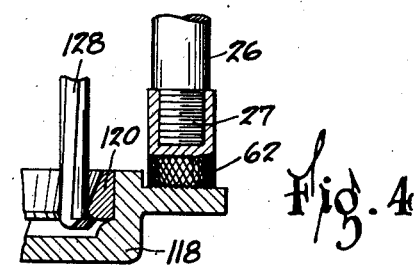
INVENTOR.
Reuben A. Kaplan
BY A. L. McCrady
ATTORNEY.

Patented July 7, 1942

2,288,906

UNITED STATES PATENT OFFICE 2,288,906

EXTRACTING TOOL

Reuben A. Kaplan, Owatonna, Minn., assignor to Owatonna Tool Company, Owatonna, Minn., a corporation of Minnesota Application October 6, 1938, Serial No. 233,604

5 Claims. (Cl. 29—85)

This invention relates to tools for inserting and extracting members such as roller bearing cups in and from their position in an assembly. More particularly, the invention contemplates a tool of improved design for extracting such members from, and replacing them in, their mountings in automotive vehicles and the like, which tool is of simplified construction, easily applied and removed, and readily adjustable to accommodate itself to a variety of different structures and conditions of operation.

An object of the invention is to provide a tool of the character indicated, which may be readily changed to adapt it to exert a pushing, rather than a pulling, force, and vice versa.

A further object of the invention is to provide a tool of the character indicated which is of simplified design and sturdy and reliable in operation.

Further objects and advantages of the invention will be apparent from the following description, taken in connection with the appended drawing, in which:

Figure 1 is a view in perspective of a device which embodies the invention, showing it applied for extraction of a roller bearing from the rear axle of an automobile;

Figure 2 is a similar view of the device applied for replacing the roller bearing in its mounting;

Figure 3 is a detail view of the bearing splitter forming a part of the device; and Figure 4 is a fragmentary view showing a modified form of connecting means between the tool and the work.

Referring more particularly to Figure 1 of the drawing, there is shown therein an axle 10, which may be the rear axle or the spindle of an automobile or other vehicle, and having a tapered portion 12 terminating in a threaded end 14. Mounted on the axle is a member, such as the roller bearing race 16, which it is desired to remove. The bearing race is engaged at its inner surface by a bracket or clamp 18, described below.

The means for exerting force on the bracket 18, and thence on the bearing, comprises a cross-head 22 having transverse slots 24 at its ends designed to receive two legs 26 which may move independently of each other longitudinally of the slots for lateral adjustment, the cross-head and legs together forming a yoke. At its lower end each leg 26 has a threaded portion 27 of reduced diameter, which engages a threaded bore 29 in the bracket 18. At its upper end, each leg 26 has a threaded portion 28 of reduced diameter, forming at its junction with the remainder of the leg a shoulder 30. Shoulder 30 seats against a bearing member 32 which extends crosswise of the cross-head 22 and has flanges at its ends for retaining the member in position. The reduced portion 28 at the upper end of each leg 26 is provided with a nut 34 and washer 36 for clamping the leg in its laterally adjusted position. It will be understood that the terms "upper," "lower," etc. as used in this description apply to the device in the position shown in the drawing, not necessarily as it is applied in use.

A threaded member 38 passes loosely through a hole 40 in cross-head 22 and abuts against the end 14 of axle 10. Member 38 carries a nut 42 which is designed to be rotated by a wrench so as to apply compression to member 38 through a washer 43. The upper end of member 38 is formed with a squared head 44.

The bracket 18 comprises two blocks 46 spaced from each other, each block being provided with transverse bores designed to slidably receive bolts 48, which are provided with nuts 50 for forcibly drawing the blocks together. Each block is cut away to provide an arcuate portion 52 of reduced thickness, which in turn is cut away at its mid-section to provide an arcuate edge 54. The edge 54 is preferably located very close to the upper surface of the blocks 46, as seen in Figure 1, so that when the bracket 18 is reversed, as in Figure 2, the edge may be inserted between a bearing or gear and its abutting member even though the abutting member is of greater diameter than the bearing or gear.

Where the device is to be used for extracting a bearing race, it is applied in the manner shown in Figure 1. The bracket 18 is first passed over the bearing race 16 so that the edges 54 register with the space or crack between the bearing and its abutting member, indicated at 56 in Figure 1. The nuts 50 are then tightened, so that the edges 54 tend to wedge between and separate members 16 and 56. In some cases, the wedging force exerted by these edges will be sufficient to loosen the bearing race; where it is not, the pulling device is applied by screwing the threaded ends of legs 26 into the blocks 46. Member 38 is then rotated to bring it into engagement with the end 14 of axle 10, and nut 42 is rotated so as to exert compresssion on the member 38 and tension on the legs 26. The force exerted in this manner, assisted if necessary by tapping the blocks 46 and the head 44 of member 38, will loosen the bearing race 16, permitting it to be removed.

In Figure 2, the bracket 18 is inverted relative to its position in Figure 1, to facilitate its exerting a pushing force on a bearing race, indicated at 58, tending to force it onto its seat. Nut 42 and washer 43 are disposed on top of the crosshead 22, instead of below it as in Figure 1. A coupling nut 60 is provided having two threaded bores, the larger of which engages the threaded end 14 of axle 10, the smaller of which engages the lower end of member 38. In this arrangement, the parts being properly adjusted, rotation of nut 42 puts member 38 under tension and legs 26 under compression, forcing member 58 into position on the axle 10.

Figure 4 shows how the pulling device may be employed in connection with a pulling tool of the type disclosed in Patent 2,052,304, issued August 25, 1936, to the present applicant. It will be seen that when the shanks 128 of the patented device are applied to extract a member 120 from the member 118 in which it is seated, the lower threaded ends 27 of legs 26 may be protected by a nipple 62, the working face of which is serrated so as to provide a non-slip work-engaging surface.

Although the invention has been described with reference to specific embodiments, and its operation has been described with reference to specific members being worked upon, it may be embodied in numerous other forms and applied to many other types of work; the invention is therefore not to be considered as limited except by the terms of the following claims.

It will be seen that the invention is not limited in its application to the extraction and replacement of bearings or other members, but may be used for exerting a pushing or pulling force wherever such force may be needed, as in compressing clutch springs and the like.

I claim:

1. In a pulling tool of the class described, a plurality of members having opposed sharp edges disposed in a common plane and designed to exert a wedging force between two substantially contiguous objects to be separated, means for forcing said members toward each other to cause the edges to exert such wedging force, and means for exerting a force upon said members tending to move them in a direction normal to said plane.

2. In a tool for removing and replacing bearing members, gears and the like from and in their mountings, a pair of sharp edged work engaging members spaced from each other and adapted to receive the work between them, a yoke secured to said members in reversible relation, a reaction member, means for positively securing the reaction member to the mounting, and means operative to exert force in either of two directions between the yoke and the reaction member.

3. The invention defined in claim 2, wherein the last mentioned means comprises a rotatable member threadedly engaging the reaction member and movable to opposite sides of the yoke to exert oppositely directed forces thereon.

4. In a tool of the class described, a pair of spaced members having opposed arcuate knife edges disposed in a common plane and designed to exert a wedging force between two substantially contiguous members, threaded means for forcing said members toward each other to cause the edges to exert such wedging force, a yoke comprising two legs threadedly engaging said spaced members, a reaction member, and threaded means for selectively exerting force between the yoke and reaction member in either of two opposite directions.

5. In a tool for removing and replacing bearing members, gears and the like from and in their mountings, a pair of work engaging members each having a sharp edge substantially in the plane of one of its transverse faces, means for forcibly moving said edges toward each other to cause them to exert a wedging force between two substantially contiguous portions of the work, a yoke detachably secured to said members in reversible relation, a reaction member associated with the yoke, means for positively securing the reaction member relative to the mounting, and means operative to exert force in either of two directions between the yoke and the reaction member.

REUBEN A. KAPLAN.